United States Patent [19]
Beeley

[11] Patent Number: 5,533,796
[45] Date of Patent: Jul. 9, 1996

[54] BELT CONSTRUCTION FOR VEHICLE ENDLESS TRACK

[75] Inventor: Micheal G. Beeley, Logan, Utah

[73] Assignee: LMC Operating Corp., Logan, Utah

[21] Appl. No.: 290,612

[22] Filed: Aug. 15, 1994

[51] Int. Cl.⁶ .................................................. B62D 55/24
[52] U.S. Cl. .................................... 305/188; 305/166
[58] Field of Search .................... 305/35 R, 35 EB, 305/37, 38, 54

[56] References Cited

U.S. PATENT DOCUMENTS

| | | | |
|---|---|---|---|
| 2,476,828 | 7/1949 | Skromme | 305/38 |
| 3,212,627 | 10/1965 | Beebee | 305/37 |
| 3,480,339 | 11/1969 | Kell | 305/35 EB |
| 3,546,057 | 12/1970 | Jenkins | 161/58 |
| 3,598,454 | 10/1971 | Richards | 305/35 EB |
| 3,858,948 | 1/1975 | Johnson et al. | 305/35 EB |
| 5,033,801 | 7/1991 | Beeley | 305/54 |

FOREIGN PATENT DOCUMENTS

| | | | |
|---|---|---|---|
| 3220071 | 9/1991 | Japan | 305/37 |
| 3262787 | 11/1991 | Japan | 305/37 |

*Primary Examiner*—Russell D. Stormer
*Attorney, Agent, or Firm*—A. Ray Osburn

[57] ABSTRACT

An endless belt design for endless track assemblies for use upon off-road vehicles, the belt assembly comprising an elastomeric belt reinforced by embedded fibers, a substantial portion of these fibers being embedded at an angle to the longitudinal direction of the belt especially in the area of the cleat mounting holes, so that the holes are restrained from elongation under shearing load from the mounting bolts by longitudinal components of tension in the biased or angled fabric strands.

4 Claims, 6 Drawing Sheets

BELT CONSTRUCTION FOR VEHICLE ENDLESS TRACK

BACKGROUND OF THE INVENTION

1. Field

The field of the invention is endless track assemblies for snow grooming vehicles, and more particularly the endless belts used in such assemblies.

2. State of the Art

Snow groomer vehicles use endless tracks having elongate flexible plastic belts made endless by connecting their ends with lacing or the like. The belts are typically reinforced by plies of fabric incorporated into the rubber-like belt material. Steel cleats are bolted across the belt at intervals of a few inches therealong. Each belt is engaged by a power transmitting sprocket wheel, which forces the belt to travel around a set of guiding wheels called bogies. The powered belt imparts horizontal shear force to the cleats, which engage the snow to propel the vehicle. Much development has gone into the design of the elongate cleat members, with the object of providing maximum traction and resistance to side slipping of the vehicle. Typical cleat constructions are disclosed in U.S. Pat. Nos. 3,765,731, 4,560,211, 4,281,882 and 4,059,315. Typically the ground contacting cleat, also called a grouser, is fastened to the outside of the flexible belting by bolts or rivets installed in matching holes in the cleat, belt, and a metal backing plate on the inside of the belt. The shanks of the bolts bear against the side of the holes in the belt to transfer the shearing forces to the cleats, perhaps initially aided by friction between the belt and the cleat and backing plate. The belt material is malleable, and the fabric plies are discontinuous at the holes, so that none of the remaining fabric plies or strands are positioned to resist elongation of the holes and concentrated stresses. The holes therefore become permanently elongated, which loosens the cleats upon the belt.

The fabric incorporated into the structure of state of the art flexible belts typically provides warp and woof strands, the warp being lengthwise to the belt and the woof being crosswise. The longitudinal warp fibers are intended to give the belt tensile strength in the direction of its length and the warp fibers to provide dimensional stability, and to prevent lateral disintegration or stretching of the belt in that direction. This relationship between the reinforcing fibers or cord is to a large degree responsible for the lack of elongation resistance in the cleat mounting holes, since the warp fibers are capable of only stress resistance in the longitudinal direction of the belt. Being cut at the holes in the belt in that particular location at each cleat mounting hole, there is no elongation resistance other than a very small amount provided by the malleable, rubber-like, belt material. The hole deformation and elongation occurs even with great clamping force between the cleat and the backing plate. This is because the belting material creeps under prolonged stress to relieve the clamping force, substantially eliminating the initially helpful friction between the belt and the cleats and the backing plate. The use of increased numbers of holes and bolts, as indicated for example in U.S. Pat. No. 4,281,882, FIG. 8, helps somewhat. However, this approach produces a correspondingly weakened belt, and is therefore self-limiting, and it has not proven satisfactory. In U.S. Pat. No. 5,033,801, a more effective approach to limiting hole elongation is disclosed. The aforesaid backing plate is provided with beltward projections which impress themselves into the fabric of the belt without rupture of the associated strands of fabric, to resist a large portion of the shearing force, relieving the stress upon the holes through the belt. Similar projections are applied to a belt contacting portion of the grouser extending upwardly to embed into the outside of the belt. See FIG. 8. In accordance with a variation of this approach, existing cleat and backing plate assemblies may be supplemented by a gripping plate interposed between the existing grouser and the belt, carrying the aforesaid projections. See FIG. 12. These approaches to the hole elongation problem have proven significantly successful, although not completely elimininating the problem. Also, they require additional expense and design effort to be directed into the grouser, the backing plate and any interposed gripper plates. An improved endless track assembly, including an improved belt design itself more resistant to hole elongation, is needed.

BRIEF SUMMARY OF THE INVENTION

Eliminating or substantially alleviating the foregoing disadvantages of existing endless belt designs for endless track assemblies, the present invention comprises such a belt incorporating substantial numbers of reinforcing fiber strands placed at substantial angles to both the warp and woof directions.

Preferably, fibers are provided angled toward both sides of the belt, crossing each other. The tension in these angled strands provides a component of resistance to elongation of the bolt mounting holes. This is generally missing in current tracked belt designs, wherein both warp and woof fibers are discontinuous at each bolt hole. Only after unacceptable hole elongation has occurred are adjacent continuous woof fibers deformed enough to provide any resistance at all to further distortion.

Preferably, the angled fabric strands are made of substantially non-elastic material. With the angled non-elastic fibers, elongation of the hole is resisted immediately, to be prevented or minimized, the fibers immediately acquiring resisting tensile forces. The designer may however, because of other belt design considerations, wish to employ material which is more elastic. In such instances, initial hole elongation will be greater, but the hole roundness is substantially restored by elastic rebound of the fibers.

In accordance with one embodiment of the invention, the angled fibers are provided throughout the length of the belt, while in another embodiment angled fibers are only provided in the belt portions carrying the cleat mounting bolt holes.

It is therefore the principal object of the invention to provide an improved flexible belt construction for the endless tracks of vehicles, which substantially improves the resistance thereof to cleat mounting bolt hole elongation and consequent cleat loosening during operation of the vehicle.

BRIEF DESCRIPTION OF THE DRAWINGS

In the drawings, which represent the best modes presently contemplated for carrying out the invention.

DETAILED DESCRIPTION OF ILLUSTRATED EMBODIMENTS

Figure 1:
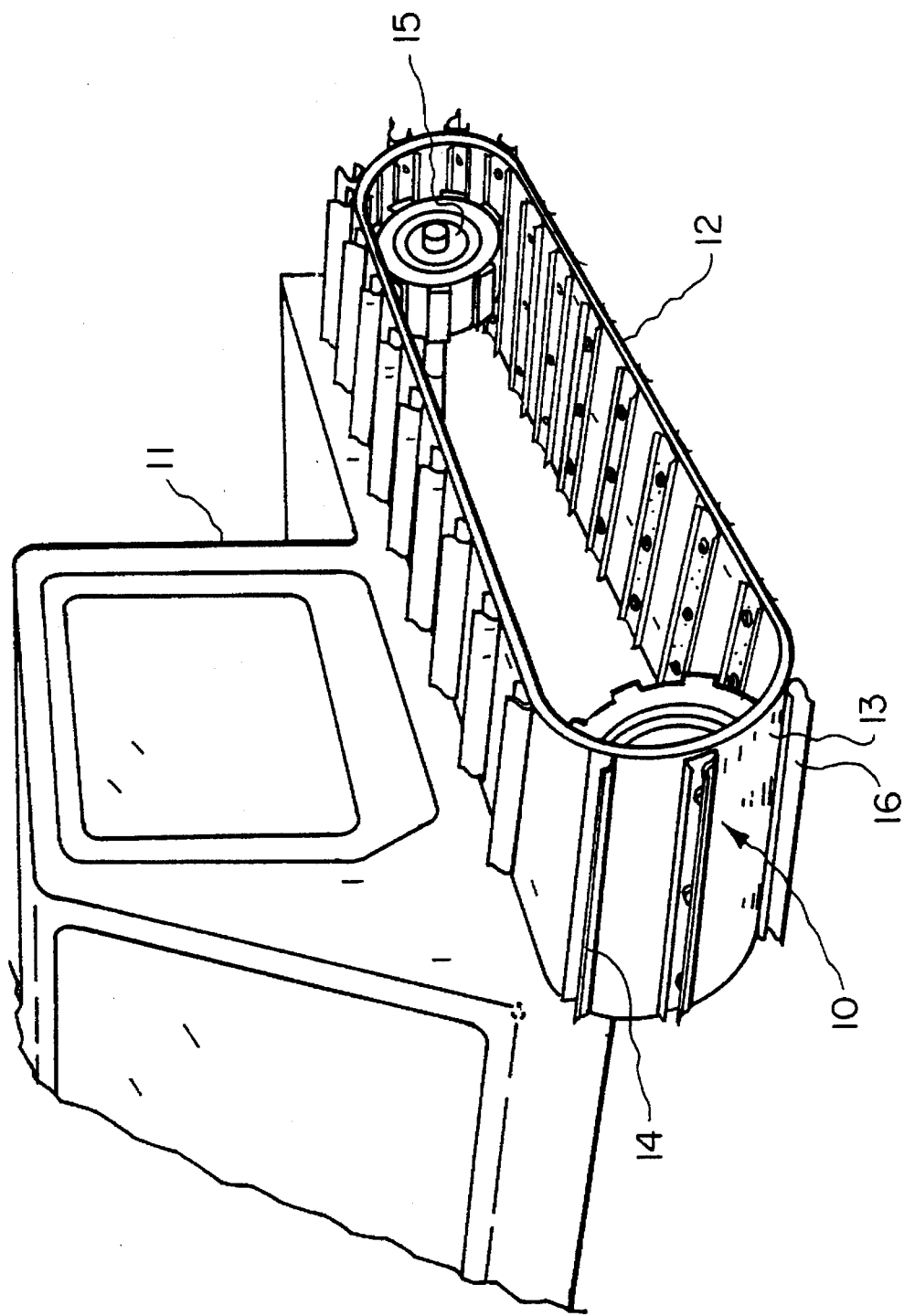
FIG. 1 is an upper right perspective view of an endless track assembly having a flexible belt and attached cleat assemblies in accordance with the invention, the associated vehicle being shown fragmentally, drawn a reduced scale, FIG. 2 a vertical cross sectional view of a state of the art belt with a state of the art cleat mounted thereon, drawn to approximately full scale, FIG. 3 an upper left perspective view of a fragment of the endless belt of FIG. 1, showing an attached state of the art cleat assembly and indicating state of the art reinforcing fabric embedded into the belt, drawn to the scale of FIG. 2, FIG. 4 a vertical cross sectional view of another state of the art belt and cleat design, showing the employment of projections upon cleat components, drawn to the scale of FIG. 2, FIG. 5 a fragment of the state of the art belt of FIG. 3, cut away to show the state of the art fabric plies and fibers incorporated therein, drawn to approximately the same scale, FIG. 6 another fragment of the belt of FIG. 2, shown in perspective and indicating state of the art fabric plies embedded therein, drawn to approximately full scale.

An endless track assembly, with a belt 10 in accordance with the invention, is shown in FIG. 1 installed upon an off-road vehicle 11, fragmentally indicated. Vehicle 11 may be a snow groomer for use in ski areas, for example. The track assembly 12 comprises a flexible belt 10 of soft plastic, made endless by lacing, not shown, joining its ends together. Cleat assemblies 14 are secured crosswise to the belt 10 at intervals therealong. Track 12 is supported upon the vehicle by wheels 15, one of which is connected to the engine of vehicle 11 to provide power to the track. Ground engaging members 16 of cleat assemblies 14, interchangeably called cleats or grousers, are constructed in many configurrations in various vehicle designs, each calculated to provided improved traction with the snow, to prevent side slip of the vehicle, or otherwise perform more desirably and efficiently. However, the present invention is not concerned with cleat traction developing qualities, but with methods of constructing belt 10 so that the grousers 15 may be secured thereto more reliably in permanently tight condition. More specifically, the present invention is primarily concerned with internal construction features of belt 10 to help achieve this objective.

Figure 2:
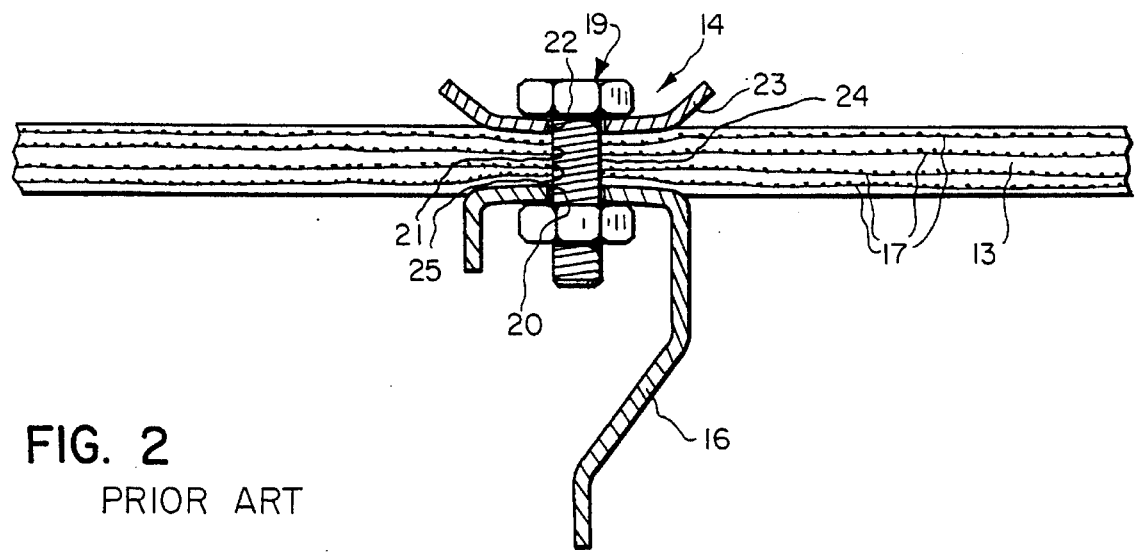
Figure 3:
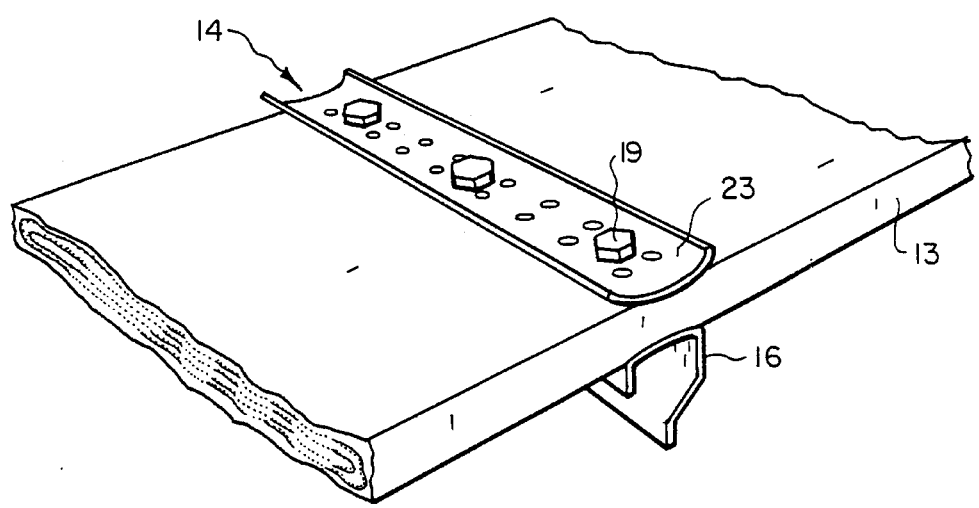

Belt 10 is typically constructed of rubber-like plastic material, sometimes called synthetic rubber, of which neoprene, butyl rubber and nitrile rubber are examples. In state of the art track belt designs, the material is commonly reinforced by multiple plies of fabric incorporated into the belt structure, to provide longitudinal resisting strands of fibers. In these state of the art assemblies, the fabric plies enable it to withstand high tension forces without excessive stretching. A fragment of prior art belting material having four embedded fabric plies 17 is shown in FIG. 2. Typically, the plies have non-elastic polyester threads longitudinal to the belt, with very elastic, non-abrasive, nylon cross threads. The cross threads are used primarily to maintain the lateral dimensional stability of the belt to retain it generally in undeformed condition.

Figure 4:
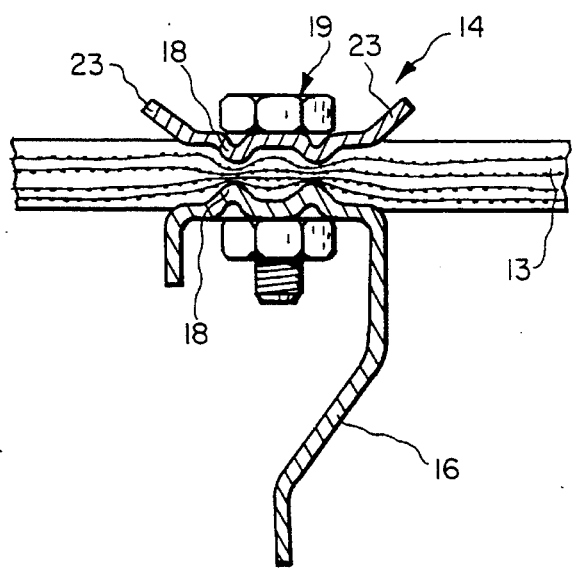

Regardless of the flexible plastic material used for belt 10, it is generally elastic in the short term, but deforms plastically under long duration stress. Both of these characteristics of the belt material create difficulties in securing the cleat assemblies 14 to the belt so that it will not loosen. Elastic gives acts against achieving permanently high clamping forces needed to develop sufficient shear resisting friction between the grouser and the surface of the belt. Plastic give under prolonged stress exacerbates the situation by tending to relieve the clamping forces, destroying whatever friction has successfully been developed initially. Partially countering this, projections 18 are sometimes effectively employed on cleat components as seen in prior art FIG. 4. Substantial hole elongation may still however occur.

Figure 6:
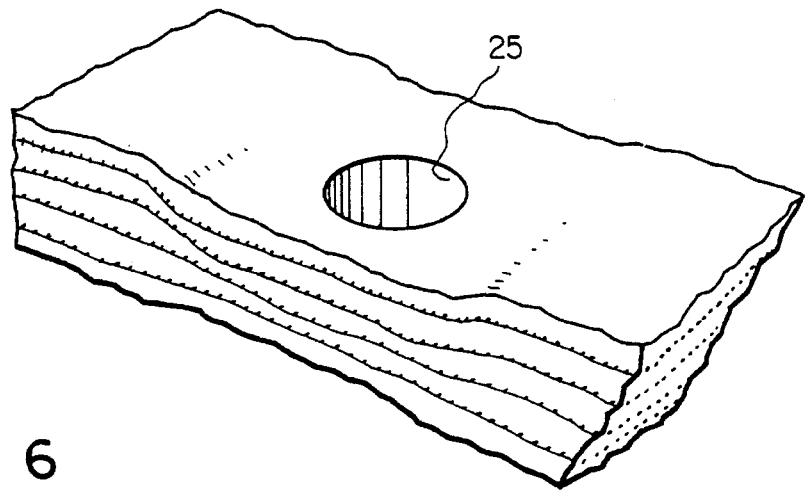
Figure 7:
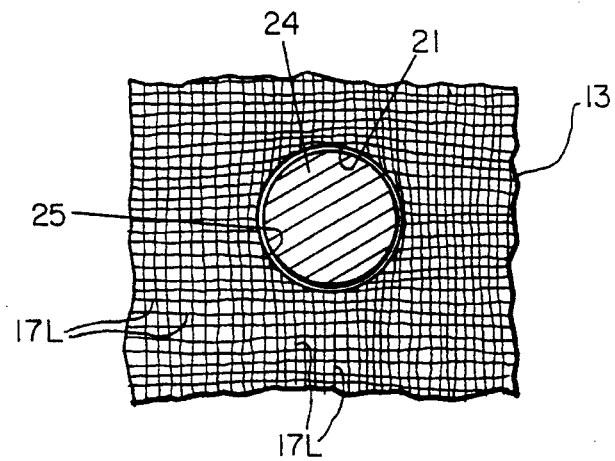
FIG. 7 a fragment of the belt of FIG. 6 cut away to show the pattern of reinforcing fibers embedded therein in state of the art fashion, indicating also the cleat mounting bolt in cross section, drawn to approximately full scale, FIG. 8 the fragment of FIG. 6, wherein the belt has been employed upon an endless track design, showing the distortion of the fabric from the mounting bolt, drawn to the scale of FIG. 7, FIG. 9 an upper front perspective view of a fragment of the inventive belt, being sectioned into portions indicating the orientation of reinforcing fabric and strands incorporated into the flexible material of the belt, drawn to the approximate scale of FIG. 6, FIG. 10 a horizontal cross sectional view of a fragment of a flexible belt in accordance with the invention, showing the orientation of the angled fibers therein, drawn to the approximate scale of FIG. 9, FIG. 11 the cross sectional view of FIG. 10 wherein the inventive belt has been employed upon an endless track assembly, showing the reduced hole distortion and the pattern of angled fabric and fibers resisting the elonggation, drawn to the scale of FIG. 10, FIG. 12 a diagrammatic view showing the components of forced developed in individual angled fibers in accordance with the invention, drawn to the scale of FIG. 11, and FIG. 13 a perspective representation of an embodiment of a belt assembly in accordance with the invention, wherein angled fiber reinforcement is provided only in the vicinity of the cleat mounting bolt holes, drawn to a reduced scale.
Figure 8:
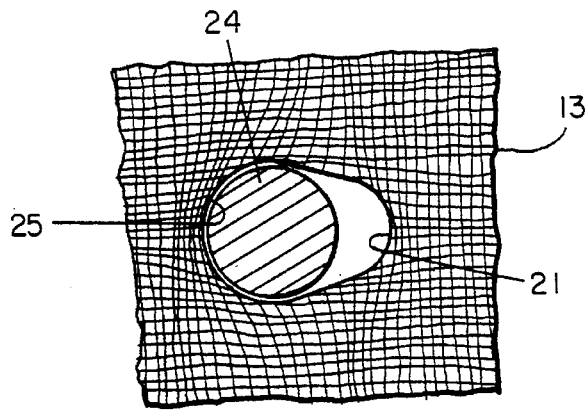

More typically, state of the art track assemblies are as illustrated in FIG. 2, not utilizing projections 18. The cleat assembly is secured to belt 13 by bolt assemblies 19 installed in aligned holes 20, 21 and 22 in the grouser plate 16, belt 13 and a metallic backing plate 23 respectively. The belt contacting surfaces of grouser 16 and plate 23 respectively are typically flat and smooth. Prior art belt 13 is squeezed between grouser plate 16 and backing plate 23 by the bolt assemblies 19. Either initially or with passage of time, the friction developed upon the grouser and backing plate surfaces tend to be, or to become, insufficient to resist the shear load between the belt and the cleat assembly. The shear load must then be resisted by bearing of bolt shanks 24 against sides 25 of the belt mounting holes 21. Prior art FIGS. 6–8 illustrate a fragment of a prior art belt after an extended period of use. The belt is reduced in thickness from the squeeze of the grouser 16 and backing plates 23. Prior art FIG. 6 shows the longitudinal fibers 17L and cross fibers 17C severed to provide the holes 21, and prior art FIG. 8 shows the distorted holes 21. The holes 21 are deformed by shearing forces, which are not initially resisted by any fabric fibers, the longitudinal fibers 17L which could resist such forces having been severed to make the hole 21. After very significant deformation, the holes 21 are able to take advantage of longitudinal components of the tension in some of the cross fibers 17C which have been bent sufficiently in the longitudinal direction to have tensile stress. However, this cannot occur before the concentrated bearing forces elongate the unsupported holes 21 permanently, which loosens the cleat assemblies on the belt. Maneuvering the vehicle both forwardly and backwardly alternates the directions of the forces on the holes 21, deforming-them in both forward and rearward directions. However, the inventive design of belt 10 minimizes distortion of the holes in both directions.

Figure 5:
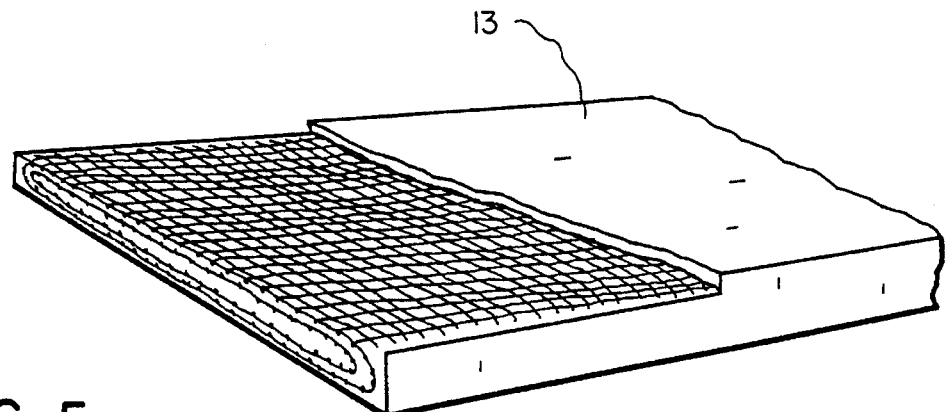
Figure 9:
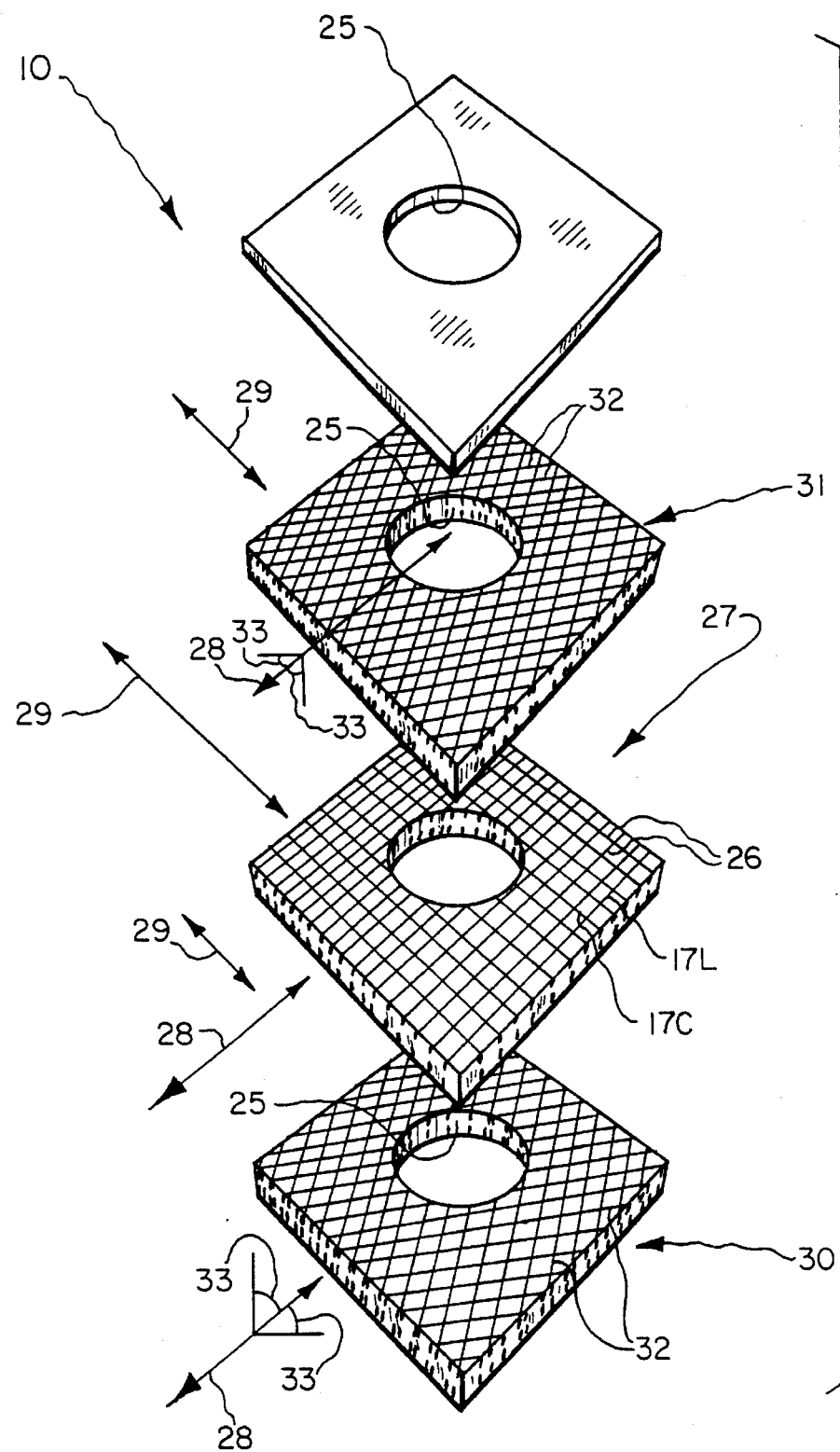

A preferred embodiment of the inventive belt 10 is indicated in FIG. 9, wherein a fragment of the belt assembly is shown as if sliced along horizontal planes to expose the various embedded layers of woven reinforcing fabric 26. Central portion 27 discloses warp (longitudinal) and woof (crosswise) fabric cord 17L and 17C respectively. The longitudinal direction of belt 10 is indicated by arrow 28 and the lateral direction by arrow 29. The general placement and orientation of fabric 26 of interior portion 27 is similar to that shown in prior art FIG. 5. The warp fiber 17L of this fabric is typically of non-elastic polyester, while the woof fiber 17C is of elastic nylon. Portions 30 and 31, respectively below and above center portion 27, carry at least one layer of fabric 26 installed with all fibers 32 oriented at a substantial angle 33 with longitudinal belt direction 28. All fibers 32 are selected to be of non-elastic material such as the polyester of the longitudinal fibers in state of the art belt designs.

Figure 10:
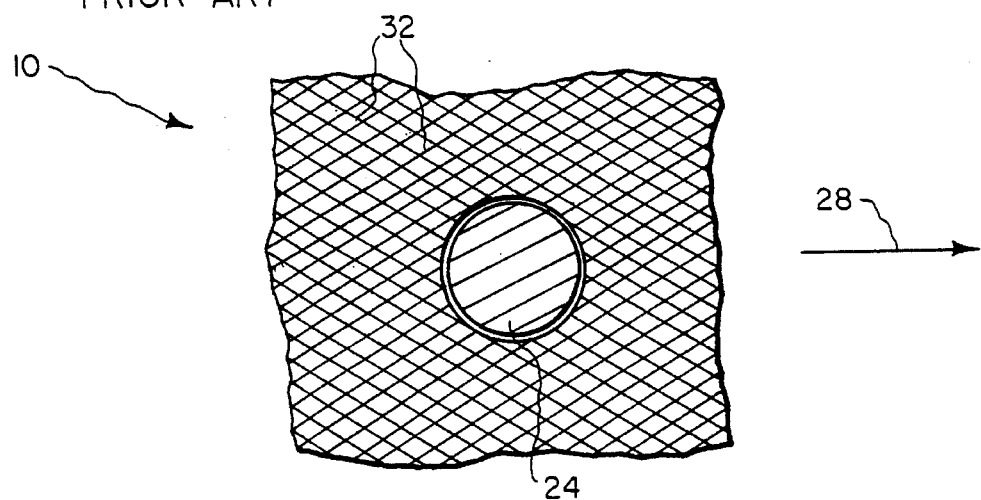
Figure 11:
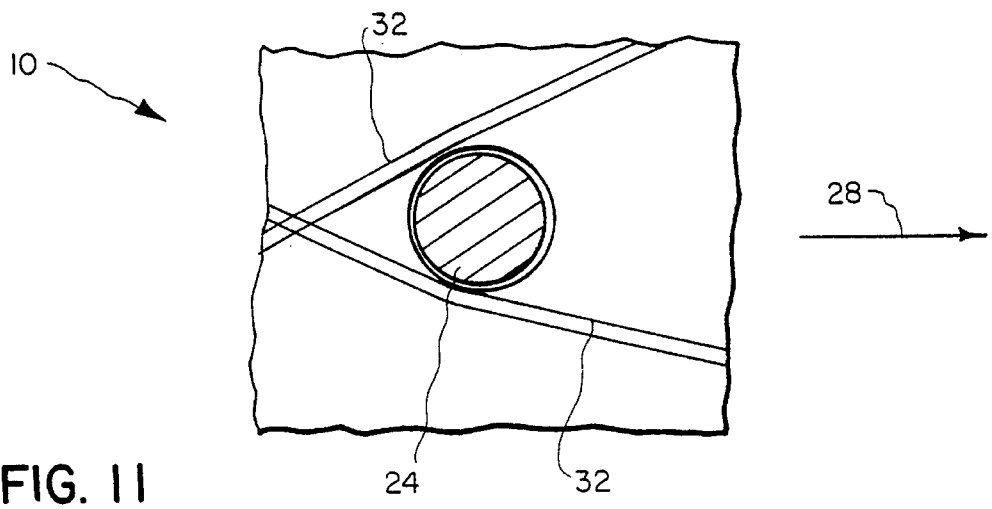
Figure 12:
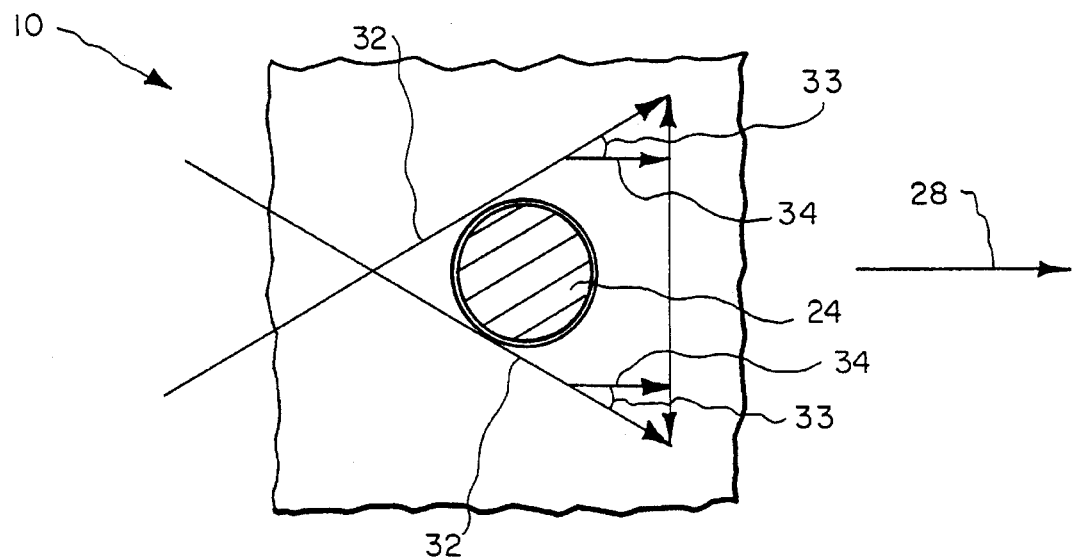
Figure 13:
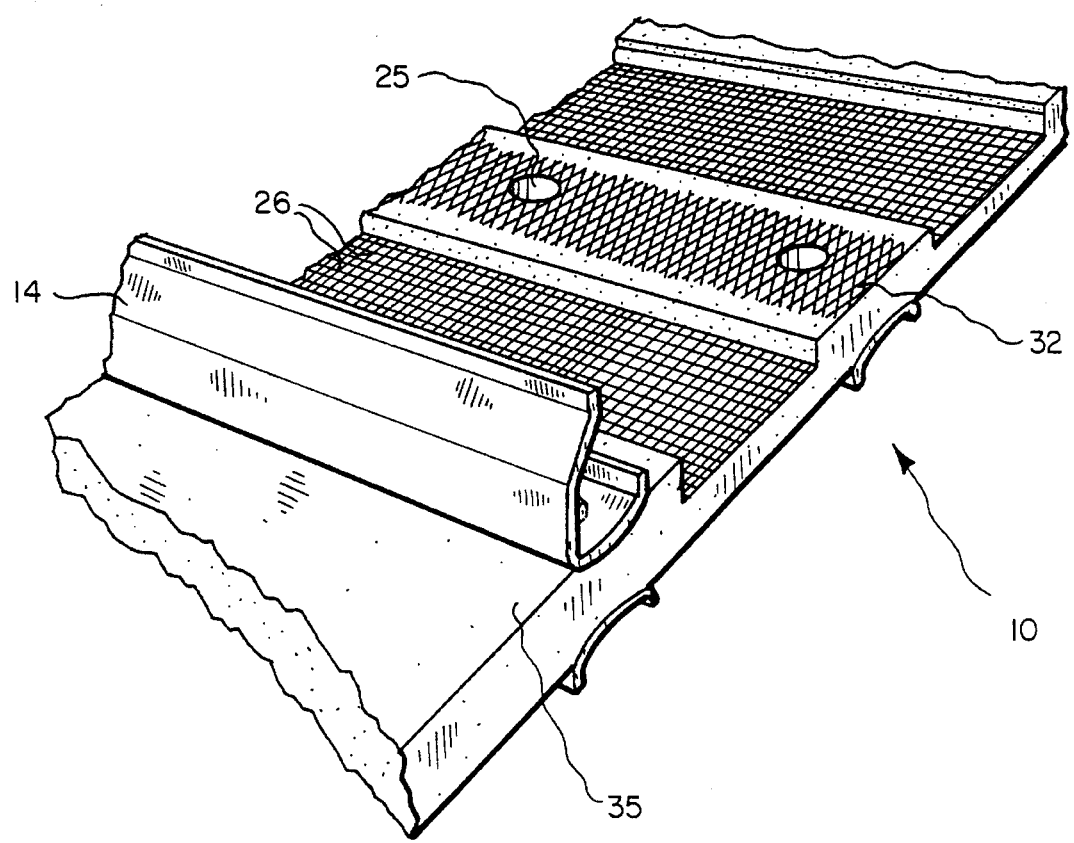

These angled non-elastic fabric strands directly and immediately oppose the elongation of the holes 21. FIGS. 10 and 11 show the angled fiber orientation in the hole area before and after use of the belt in track 12 to propel vehicle 11. The angled fibers 32 are immediately tensioned, before significant elongation of hole 21, resisting further movement of bolt shanks 24. FIG. 12 indicates how a tensile, distortion resisting, component 34 is produced in the fibers 32 adjacent holes 21. Compare with prior art FIGS. 6 and 7, indicating the virtual absence of distortion resisting tensile forces in the fibers of prior art belt designs. The present design, incorporating the layers of angled fabric strands, provides immediate resistance to hole distortion and elongation.

The number and spacing of the angled fiber strands 32 for best performance must be determined by the belt designer, possibly aided by experimentation. Angled fabric strands may be incorporated centrally to the belt, near the upper or lower surfaces, or both, the latter being indicated in FIG. 9. Where action of the belt may be known to produce more bolt pressure on one side or the other of belt 10, the angled fibers may be placed correspondingly to directly resist the greatest distorting force, for example. In general, for maximum resistance to hole distortion, the angled strands should be as non-elastic as possible. However, for example, some compromise toward more elasticity with less abrasiveness may sometimes be desirable. The angled fibers 32 may be, to facilitate construction of the belt, woven into a fabric netting. The individual strands need not necessarily cross at right angles. Optimizing of the strand angle 33 may similarly require experimentation.

Another option for the designer's consideration is to provide angled fibers only in selected portions 35 of the belt 10 containing the holes 21. Such an angled fiber pattern would protect against hole distortion perhaps more economically, but perhaps at the expense of greater complexity and reduced uniformity in belt design.

These variations, and others neither mentioned nor illustrated, may within the spirit and scope of the invention as indicated by the appended claims, be embodied therein along with all equivalents thereto.

What is claimed and desired to be secured by United States Letters Patent is:

1. An flexible vehicle track assembly, comprising:

an endless strip of flexible plastic material reinforced by a multiplicity of strands of fiber embedded therein;

cleat assemblies affixed to the belt at intervals therealong, each including at least one cleat mounting bolt acting within an associated bolt hole provided through the belt; wherein at least a fraction of the multiplicity of reinforcing strands is provided embedded within each portion of the belt carrying said bolt hole, said strands being placed in a pattern surrounding said bolt hole and each being directed a substantial angle to the longitudinal direction of the belt, said angle being substantially less than 90°.

2. The track assembly of claim 1, wherein:

the angularly directed fraction of the reinforcing strands includes strands directed at substantial angles in both directions to the longitudinal direction of the strip.

3. The track assembly of claim 2, wherein:

the strands of the angularly directed fraction of the reinforcing strands are substantially non-elastic.

4. The track assembly of claim 1, further comprising:

substantially non-elastic reinforcing fibers embedded within the strip the full length thereof, directed longitudinally thereto;

substantially elastic laterally directed reinforcing fibers embedded within the strip the full length thereof.

* * * * *